(12) United States Patent
Mercier

(10) Patent No.: US 8,991,540 B2
(45) Date of Patent: Mar. 31, 2015

(54) DIRECTIONAL CONTROL SYSTEM FOR HOVERCRAFT

(71) Applicant: Michael William Mercier, Chicago, IL (US)

(72) Inventor: Michael William Mercier, Chicago, IL (US)

(*) Notice: Subject to any disclaimer, the term of this patent is extended or adjusted under 35 U.S.C. 154(b) by 0 days.

(21) Appl. No.: 13/916,661

(22) Filed: Jun. 13, 2013

(65) Prior Publication Data

US 2013/0333968 A1 Dec. 19, 2013

Related U.S. Application Data

(60) Provisional application No. 61/659,929, filed on Jun. 14, 2012.

(51) Int. Cl.
*B60V 1/14* (2006.01)
*B60V 3/02* (2006.01)
*B60V 1/11* (2006.01)

(52) U.S. Cl.
CPC .... *B60V 3/02* (2013.01); *B60V 1/11* (2013.01)
USPC .......................................... 180/117; 180/116

(58) Field of Classification Search
CPC ................................... B60V 1/14; B60V 1/00
USPC .................................................. 180/116, 117
See application file for complete search history.

(56) References Cited

U.S. PATENT DOCUMENTS

| | | | |
|---|---|---|---|
| 3,265,142 A | 8/1966 | Winter | |
| 3,605,937 A | 9/1971 | Kirwan | |
| 3,746,116 A | 7/1973 | Schwingshandl | |
| 3,870,121 A * | 3/1975 | Schneider | 180/117 |
| 3,887,030 A | 6/1975 | Fitzgerald et al. | |
| 4,111,277 A * | 9/1978 | Peissel et al. | 180/122 |
| 4,156,475 A * | 5/1979 | Chaplin | 180/117 |
| 4,747,459 A | 5/1988 | Penha | |
| 5,096,012 A | 3/1992 | Chia et al. | |
| 5,273,128 A | 12/1993 | Clendening et al. | |
| 5,307,893 A | 5/1994 | Bender et al. | |
| 5,386,880 A * | 2/1995 | Dubose | 180/117 |
| 5,495,911 A * | 3/1996 | Mamonov | 180/116 |
| 5,823,283 A * | 10/1998 | Mamonov | 180/116 |
| 5,941,331 A | 8/1999 | Gastesi | |
| 6,591,928 B1 | 7/2003 | Blum | |
| 6,715,574 B1 | 4/2004 | Bertelsen et al. | |
| 7,383,907 B2 | 6/2008 | Talanov et al. | |
| 2011/0002786 A1* | 1/2011 | Perkinson | 416/154 |

* cited by examiner

*Primary Examiner* — Kevin Hurley
*Assistant Examiner* — Michael Stabley
(74) *Attorney, Agent, or Firm* — Zareefa B. Flener; Flener IP Law

(57) ABSTRACT

A hovercraft including a directional control system is disclosed. The directional control system includes at least one airflow control assembly configured to generate and direct at least one airflow. The at least one airflow generated and directed by the airflow control assembly results in component forces that are used to move and control the hovercraft in lateral, forward and reverse directions, or any degree of direction between the lateral, forward and reverse directions. The configuration of the at least one airflow control assembly enables precise control over movement of the hovercraft.

2 Claims, 3 Drawing Sheets

DIRECTIONAL CONTROL SYSTEM FOR HOVERCRAFT

CROSS-REFERENCE TO RELATED APPLICATIONS

This application claims the benefit of U.S. Provisional Application No. 61/659,929, filed on Jun. 14, 2012 and entitled Directional Control System for Hovercraft, the entire disclosure of which is incorporated herein by reference.

BACKGROUND OF THE INVENTION

1. Field of the Invention

The invention relates to air cushion vehicles, also known as hovercraft. More precisely, the invention relates to hovercraft control systems.

2. Description of Related Art

Conventional hovercraft control systems are primarily functional in controlling the forward thrust of hovercraft. Conventional hovercraft control systems are limited in their ability to control hovercraft in the lateral and reverse directions. This limitation is particularly noticeable when a hovercraft operator desires the hovercraft to come to rest from a high speed. In this instance, the operator uses the control system to turn the hovercraft 180 degrees and move it backward towards the stopping location while applying thrust. This backward thrust will eventually slow the hovercraft to a stop. This maneuver is difficult for a novice operator to perform and, moreover, is only successful if the operator has sufficient time and distance before the desired stopping location.

SUMMARY OF THE INVENTION

The disclosure relates to an improved directional control system for hovercraft that is not limited to forward control of the hovercraft. The directional control system of the invention may have at least one source of induced airflow and means for directing the airflow to control the direction of the hovercraft in lateral, forward, and reverse directions, and any degree of direction between those extents.

According to an embodiment of the invention, an air cushion vehicle includes a hull having a front portion, a rear portion, a first side portion extending between the front portion and the rear portion, and a second side portion opposite the first side portion and extending between the front portion and the rear portion. A skirt is connected to the hull and is configured to support the air cushion vehicle above a ground surface by an air cushion in the skirt. The vehicle includes a novel directional control system. The directional control system includes at least one first airflow control assembly located at the first side portion of the hull, and at least one second airflow control assembly located at the second side portion of the hull. The at least one first airflow control assembly is configured to generate and direct a first airflow in order to control movement of the air cushion vehicle in lateral, forward and reverse directions. The at least one second airflow control assembly is configured to generate and direct a second airflow in order to control movement of the air cushion vehicle in the lateral, forward and reverse directions.

According to a further embodiment of the invention, the at least one first airflow control assembly may include a first propeller configured to generate the first airflow, and at least one first airflow control surface that is movable to direct the first airflow. The at least one second airflow control assembly may include a second propeller configured to generate the second airflow, and at least one second airflow control surface that is movable to direct the second airflow.

According to a further embodiment of the invention, the directional control system may include one or more power sources and one or more actuators. The one or more power sources may be operatively connected to the first and second propellers for rotating the first and second propellers. The one or more actuators may be operatively connected to the at least one first control surface and the at least one second control surface for moving the at least one first control surface and the at least one second control surface.

According to a further embodiment of the invention, the at least one first airflow control assembly may include a first frame attached to the hull, and the at least one second airflow control surface may include a second frame attached to the hull. The first frame may support the first propeller and the at least one first airflow control surface. The second frame may support the second propeller and the at least one second airflow control surface.

According to a further embodiment of the invention, the first and second frames and the hull may form an integral, single-piece body.

According to yet a further embodiment of the invention, the first propeller may have a first central axis and the second propeller may have a second central axis. The first and second central axes may be orthogonal to the first and second side portions of the hull.

According to yet a further embodiment of the invention, the first and second central axes may be coaxial with respect to each other.

Additional features and advantages of the invention will be apparent to those skilled in the art based on the following detailed description and the appended drawings.

DETAILED DESCRIPTION OF THE INVENTION

The following disclosure is directed at a hovercraft including at least one airflow control assembly configured to induce and direct airflow to provide movement to the hovercraft in the lateral, forward or reverse directions, and any degree of direction between those extents.

Figure 1:
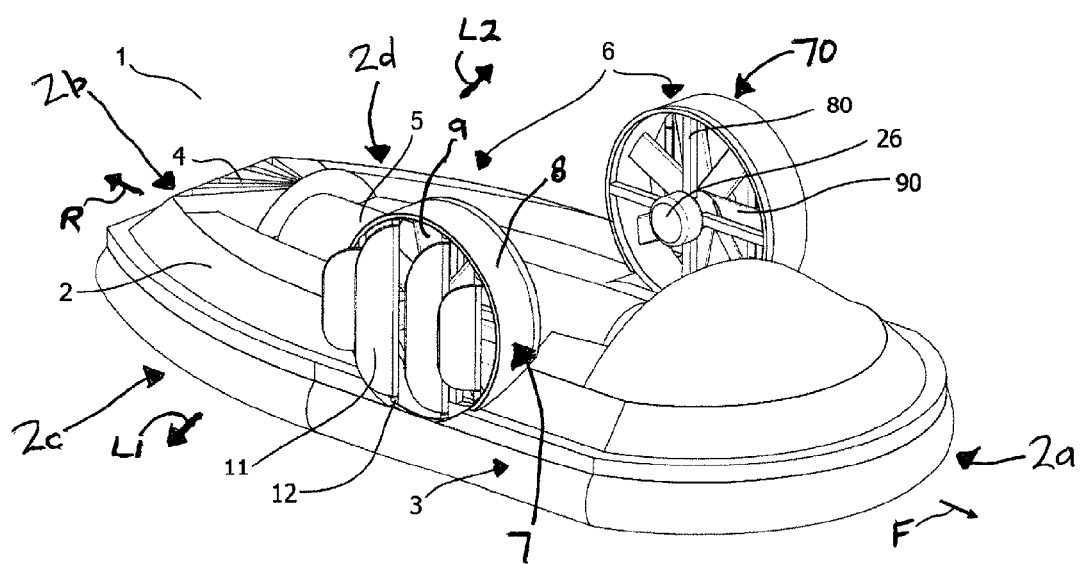
FIG. 1 is a perspective view of a hovercraft including a directional control system according to an embodiment of the invention.

FIG. 1 shows a hovercraft 1 including a hull 2, a skirt 3 connected to the hull 2, an air intake 4 and a directional control system 6. The hull 2 includes a front portion 2a, a rear portion 2b, and first and second opposing side portions 2c and 2d, respectively, that extend between the front and rear portions 2a and 2b. The hull 2 may be configured to be supported above a ground surface by an air cushion contained in the skirt 3 and produced by the air intake 4. The hull 2 may include an elongated seating area 5 for an operator. The forward direction of travel of the hovercraft 1 is indicated by the arrow F, while the rearward direction of travel of the hovercraft 1 is indicated by the arrow R. Lateral directions of travel are indicated by arrows L1 and L2.

The directional control system 6 may include a first airflow control assembly 7 mounted on the first side portion 2c of the hull 2, and a second airflow control assembly 70 mounted on the second side portion 2d of the hull 2. The airflow control assemblies 7 and 70 may be mounted such that they are mirrored copies of each other.

Figure 2:
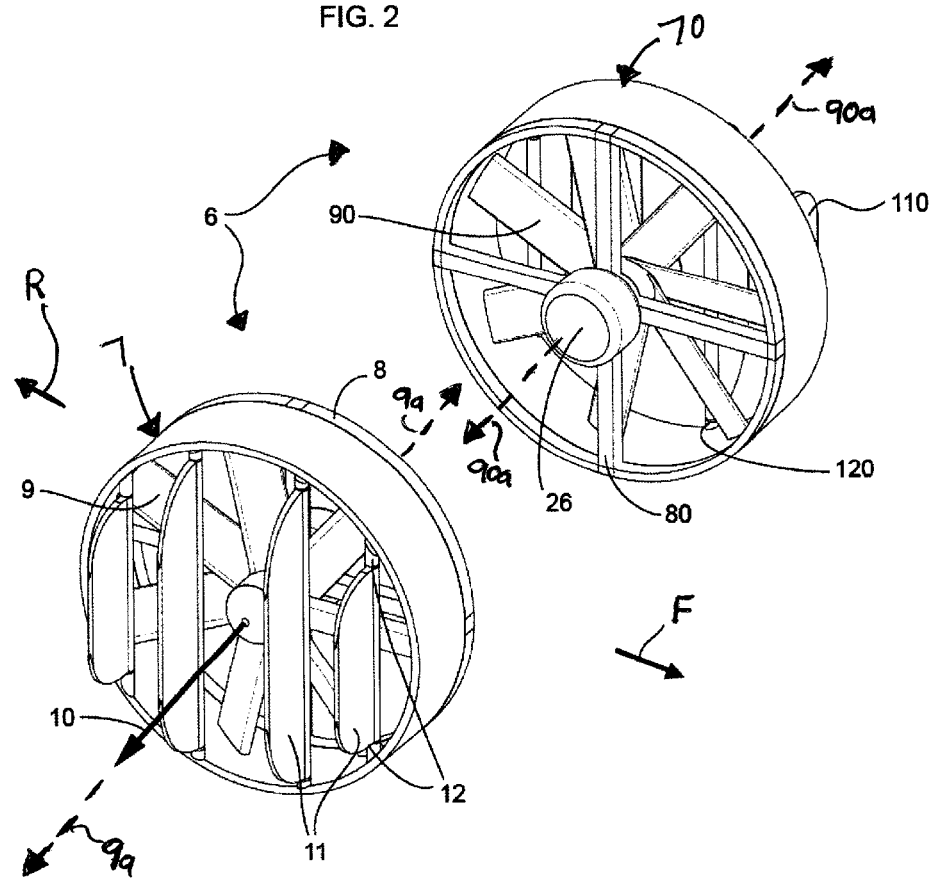
FIG. 2 is an isolated perspective view of the directional control system.

FIG. 2 shows an isolated view of the airflow control assemblies 7 and 70. As shown in FIG. 2, the airflow control assembly 7 may include a frame 8 attached to the hull 2, a fan or propeller 9 supported by the frame 8 and configured to generate airflow 10 outward from the hovercraft 1, and a one or more control surfaces or vanes 11 supported by the frame 8. In operation of the airflow control assembly 7, the airflow 10 passes over the control surfaces 11, which can pivot forward and rearward about points 12 on the frame 8. Similarly, the airflow control assembly 70 may include a frame 80 attached to the hull 2, a fan or propeller 90 supported by the fame 80 and configured to generate airflow 21 outward from hovercraft 1, and one or more control surfaces or vanes 110 supported by the frame 80. In operation of the airflow control assembly 70, the airflow 21 passes over control surfaces 110, which can pivot forward and rearward about points 120 on the frame 80. According to a preferred embodiment, central axes 9a and 90a of the propellers 9 and 90, respectively, may be coaxial and may be substantially orthogonal to the sides 2c and 2d of the hull 2.

Still referring to FIG. 2, the propellers 9 and 90 may be attached to the frames 8 and 80, respectively, in a manner that allows the propellers 9 and 90 to freely rotate. This may be accomplished by means of shafts and bearings (not shown) or other suitable components. The propellers 9 and 90 may be configured to rotate under power provided by one or more power sources (not shown) operably connected to the propellers 9 and 90. The power source(s) may be one or more internal combustion engines, electric motors or other known power sources that are suitable for use on a hovercraft. Suitable locations for the power source(s) are indicated by locations 25 and 26 in FIGS. 1-3. The power source(s) may cause the propellers to rotate by a direct drive connection or a transmitted drive connection.

The control surfaces 11 and 110 may be configured to rotate about their pivot points 12 and 120 through actuation by one or more actuators (not shown) operably connected to the control surfaces 11 and 110. The actuator(s) may be powered electrically, pneumatically, hydraulically, or in another known manner. The actuator(s) may be mechanical linkage(s), cable system(s), or other component(s) or system(s) that allow for control by the hovercraft operator.

The hovercraft 1 may be constructed using methods suitable for constructing common hovercraft, or with improvements to construction as necessary to accommodate the invention. The frames 8 and 80 may be constructed of metal or any other sufficiently strong and rigid material such as wood, composites and the like, or a combination thereof. The frames 8 and 80 may also be integrally formed with the hull 2 of hovercraft, such that the hull 2 and the frames 8 and 80 form an integral, single-piece body. The frames 8 and 80 may further incorporate shrouds (not shown) to improve the performance of the propellers 9 and 90.

Figure 3:
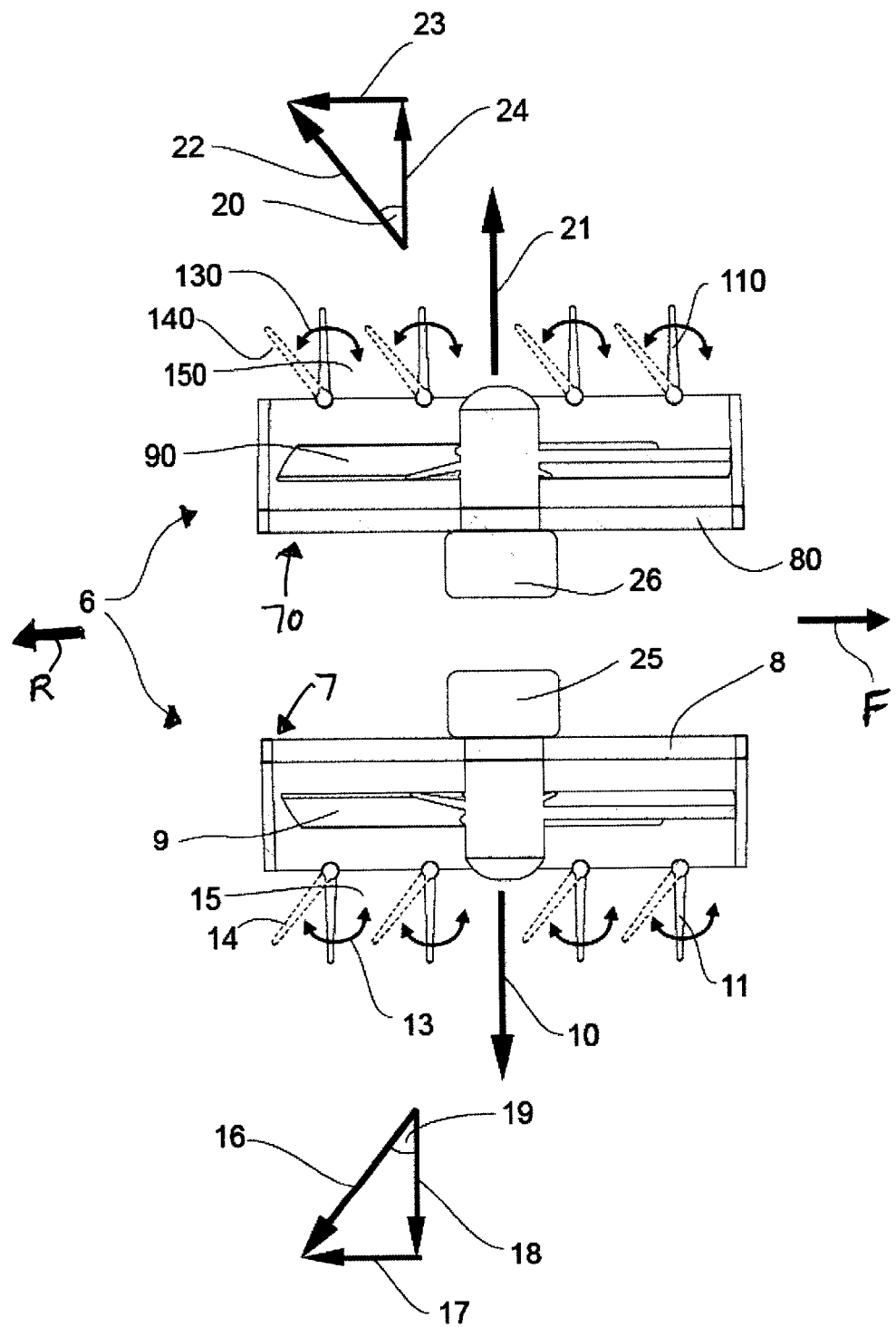
FIG. 3 is an isolated partial section view of the directional control system.

FIG. 3 provides an isolated top view of the invention, sectioned to more clearly illustrate the operation of the invention. Referring now to the detailed operation of control system 6, the control surfaces 11 and 110 may pivot in the motions shown by respective arrows 13 and 130, in ranges between positions 14 and 15 and positions 140 and 150, respectively. When in respective positions 14 and 140, the control surfaces 11 and 110 direct respective induced airflows 10 and 21 to produce respective resultant airflows 16 and 22. The respective thrust component airflows 17 and 23 provide thrust force to the hovercraft 1 reactive to the direction of the airflows and act to control hovercraft 1 in the forward direction F. The theoretical magnitude of thrust component airflow 17 may be determined by multiplying the magnitude of resultant airflow 16 by the cosine of acute angle 19 between the control surfaces 11 and the induced airflow 10. The theoretical magnitude of thrust component airflow 23 may be determined by multiplying the magnitude of resultant airflow 22 by the cosine of acute angle 20 between the control surfaces 110 and the induced airflow 21.

The lateral component airflows 18 and 24 act to stabilize hovercraft 1, providing reactive component forces perpendicular to forward direction F, and control the hovercraft 1 in the lateral directions. The theoretical magnitude of lateral component airflow 18 may be determined by multiplying the magnitude of resultant airflow 16 by the sine of acute angle 19 between control surfaces 11 and induced airflow 10. The theoretical magnitude of lateral component airflow 24 may be determined by multiplying the magnitude of resultant airflow 22 by the sine of acute angle 20 between control surfaces 110 and induced airflow 21.

When the control surfaces 11 and 110 are positioned at points 15 and 150, respectively, reverse thrust or braking force will result, acting to control hovercraft 1 in the reverse direction R, opposite forward direction F.

In further detail, referring to FIGS. 1-3, the directional forces acting on hovercraft 1 should be sufficient in magnitude to move the hovercraft 1 from a stopped position and sufficient in magnitude to maneuver the hovercraft 1 while in motion. Having the airflow control assemblies 7 and 70 in a mirrored arrangement, as shown in FIG. 1 and FIG. 3, allows directional control of airflows 10 and 21 independently of each other. With independent control of each side of the control system 6, the hovercraft 1 can be directed in heading, or steered, and moved laterally from side to side, and thus controlled in the lateral, forward and reverse directions.

The advantages of the invention include, without limitation, that it enables the hovercraft to be precisely controlled in the lateral, forward and reverse directions. Further, this directional control makes the hovercraft 1 easier and safer to operate. According to further embodiments of the invention, the airflow control assemblies 7 and 70 can be located at various locations of the hovercraft, including the sides, front or rear. Additionally, the plurality of suitable locations makes it possible for designers to have more flexibility in the visual and positional design of hovercraft. Still further, multiple airflow control assemblies 7 and 70 may be provided on the sides 2c and 2d, respectively, of the hovercraft 1.

While the foregoing description discloses specific embodiments of the invention, those of ordinary skill will understand and appreciate that variations, combinations, and equivalents of the specific embodiments disclosed herein are possible within the scope of the invention. The invention should therefore not be limited by the above described embodiments, but by all embodiments within the scope and spirit of the invention as claimed.

I claim:
1. An air cushion vehicle, comprising:
a hull having:
   a front portion, a rear portion, a first side portion extending between the front portion and the rear portion, and a second side portion opposite the first side portion and extending between the front portion and the rear portion;
   a skirt connected to the hull and configured to support the air cushion vehicle above a ground surface by an air cushion in the skirt;

and a directional control system comprising:

at least one fixed first airflow control assembly located at the first side portion of the hull and configured to generate and direct a first airflow in order to control movement of the air cushion vehicle in lateral, forward and reverse directions, and at least one fixed second airflow control assembly located at the second side portion of the hull and configured to generate and direct a second airflow in order to control movement of the air cushion vehicle in the lateral, forward and reverse directions, the at least one fixed first airflow control assembly comprises a first propeller configured to generate the first airflow, and at least one first airflow control surface that is independently movable from said first propeller to direct the first airflow; and the at least one fixed second airflow control assembly comprises a second propeller configured to generate the second airflow, and at least one second airflow control surface that is independently movable from said second propeller to direct the second airflow, wherein the first propeller has a first central axis and the second propeller has a second central axis, and wherein the first and second central axes are orthogonal to the first and second side portions of the hull.

2. The air cushion vehicle of claim 1, wherein the first and second central axes are coaxial with respect to each other.

* * * * *